(12) United States Patent
Park et al.

(10) Patent No.: US 9,032,366 B2
(45) Date of Patent: May 12, 2015

(54) METHOD AND APPARATUS FOR PERFORMING CONFIGURATION OF AERONAUTICAL SYSTEM IN COMPLIANCE WITH THE ARINC 653 STANDARD

(71) Applicant: Electronics and Telecommunications Research Institute, Daejeon (KR)

(72) Inventors: Sa-Choun Park, Gunpo (KR); Hwa-Young Lee, Seoul (KR); Byeong-Ho Gim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 193 days.

(21) Appl. No.: 13/765,891

(22) Filed: Feb. 13, 2013

(65) Prior Publication Data

US 2013/0275940 A1 Oct. 17, 2013

(30) Foreign Application Priority Data

Apr. 17, 2012 (KR) .......................... 10-2012-0039710

(51) Int. Cl.
*G06F 9/44* (2006.01)
(52) U.S. Cl.
CPC ... *G06F 8/35* (2013.01); *G06F 8/34* (2013.01)
(58) Field of Classification Search
None
See application file for complete search history.

(56) References Cited

U.S. PATENT DOCUMENTS

| 8,782,296 B2* | 7/2014 | Martinez ........................... 710/8 |
| 2013/0159477 A1* | 6/2013 | Danielsson et al. .......... 709/220 |
| 2013/0166271 A1* | 6/2013 | Danielsson et al. ............ 703/22 |

OTHER PUBLICATIONS

Gilles Lasnier et al., "A Model-Based Transformation Process to Validate and Implement High-Integrity Systems", 14th IEEE International Symposium on Object/Component/Service-Oriented Real-Time Distributed Computing, 2011, 8 pages.
Jianhua Xu et al., "Research and Implementation of ARINC653 Configuration Tool Based on AADL", IEEE Symposium on Computing & Informatics, 2011, pp. 478-483.

* cited by examiner

*Primary Examiner* — Isaac T Tecklu
(74) *Attorney, Agent, or Firm* — Staas & Halsey LLP

(57) ABSTRACT

Disclosed herein are a method and apparatus for performing a configuration of an aeronautical system. The apparatus includes a display unit, an intermediate model generation unit, an Extensible Markup Language (XML) conversion unit, and a translator. The display unit display displays a user interface for receiving aeronautical system setting information in compliance with an ARINC 653 standard. The intermediate model generation unit generates an intermediate model of source code based on the setting information received via the user interface. The XML conversion unit creates an XML document by performing XML conversion on the generated intermediate model. The translator generates a source code file in compliance with the ARINC 653 standard by converting the generated XML document.

10 Claims, 9 Drawing Sheets

```
</xs : annotation>
        <xs : element name="Q653_ShareIOList">
            <xs : sequence maxOccurs="unbounded">           ⎫
                <xs : element name="SharedIO"              ⎬ 301
type="Q653_SharedIOType"/>                                 ⎭
            </xs : sequence>
        </xs : element>
    </xs : sequence>
    <xs : attribute name="ModuleName" type="NameType" use="optional"/>
    <xs : attribute name="ModuleVersion" type="NameType" use="optional"/>
    <xs : attribute name="ModuleId" type="IdentifierValueType" use="optional"/>
    </xs : complexType>
</xs : element>
<xs : complexType name="Q653_SharedIOType">                                            ⎫
    <xs : sequence minOccurs="1" maxOccurs="unbounded">                                │
        <xs : element name="Authorities" type="Q653_AuthoritiesType"/>                 │
    </xs : sequence>                                                                   │
    <xs : attribute name="Name" type="NameType" use="required">                        │
    </xs : attribute>                                                                  │
    <xs : attribute name="PhysicalAddress"                                             │
            type="DecOrHexValueType" use="required"> </xs:attribute>                   │
    <xs : attribute name="Size" type="DecOrHexValueType" use="required">               │
    </xs : attribute>                                                                  │
</xs : complexType>                                                                    │
                                                                                       │
<xs : complexType name="Q653_AuthoritiesType">                                         │
    <xs : attribute name="PartitionID" type="IdentifierValueType" use="required">      │
    </xs : attribute>                                                                  ⎬ 302
    <xs : attribute name="Access" type="AccessType" use="required">                    │
    </xs : attribute>                                                                  │
</xs : complexType>                                                                    │
                                                                                       │
<xs : simpleType name="AccessType">                                                    │
    <xs : annotation>                                                                  │
        <xs : documentation>Predefined Qplus653 Access                                 │
control</xs:documentation>                                                             │
        <xs : restriction base="xs:string">                                            │
            <xs : enumeration value="NONE"/>                                           │
            <xs : enumeration value="READ_ONLY"/>                                      │
            <xs : enumeration value="WRITE_ONLY"/>                                     │
            <xs : enumeration value="READ_WRITE"/>                                     │
        </xs : restriction                                                             │
</xs : simpleType>                                                                     ⎭

<xs : complexType name="PortType">
```

FIG. 3

METHOD AND APPARATUS FOR PERFORMING CONFIGURATION OF AERONAUTICAL SYSTEM IN COMPLIANCE WITH THE ARINC 653 STANDARD

CROSS REFERENCE TO RELATED APPLICATION

This application claims the benefit of Korean Patent Application No. 10-2012-0039710, filed on Apr. 17, 2012, which is hereby incorporated by reference in its entirety into this application.

BACKGROUND OF THE INVENTION

1. Technical Field

The present invention relates generally to a method and apparatus for performing a configuration of an aeronautical system, which facilitate ARINC 653 configurations when writing an aeronautical application program in accordance with the ARINC 653 standard, and, more particularly, to a method and apparatus that facilitate the setting of an aeronautical system using a method and apparatus for receiving setting information via a user interface, a method and apparatus for allowing set information to refer to a target source code template, and a method and apparatus for generating source code from the setting information.

2. Description of the Related Art

The fields of industry requiring a high-level of safety, such as the aeronautical and nuclear power generation industries, have the tendency to adhere to existing system architectures. However, this tendency leads system management to high-cost, low-efficient structures, and therefore a changeover to architectures that use high-performance processors is being called for. A high-performance processor allows a plurality of application programs to run on a single processor, but it is difficult to guarantee safety in that environment. Therefore, safety should be basically provided at the level of a platform.

Accordingly, for the management of an aeronautical system, Aeronautical Radio, Inc. established an avionics standard in order to enhance safety and maintain compatibility in aeronautical management.

In particular, ARINC 653 stipulates the interface between a real-time Operating System (OS) and application programs running on the real-time OS. That is, ARINC 653 is a standard for the development of aeronautical software, and is a real-time OS Application Programming Interface (API) standard that is needed for integrated modular avionics systems. ARINC 653 stipulates APplication EXecutive (APEX), which is the interface between an OS and application programs running on the OS.

Therefore, using the standard API, the dependency on developing hardware can be reduced, the portability to other systems can be enhanced, and the simultaneous development of aeronautical system applications can be facilitated, in the development of avionics software.

ARINC 653 is used in conjunction with the concept of Integrated Modular Avionics (IMA). While an existing federated system runs application software on a plurality of processors, IMA is based on a platform concept that replaces a plurality of processors with a single high-performance processor. A federated system has the disadvantage of each function separately running on one or more processors, and the disadvantage of having software that is poor in terms of reuse, portability and modularization. IMA has the advantage of enabling a plurality of functions to be performed on a single processor and the advantage of increasing the reuse, portability and modularization of software.

However, while ARINC 653 system settings play a decisive role in enhancing the portability of aeronautical application software, ARINC 653 system settings have the problem of having the risk of erroneous set values leading to a fatal defect.

SUMMARY OF THE INVENTION

Accordingly, the present invention has been made keeping in mind the above problems occurring in the prior art, and an object of the present invention is to provide a method and apparatus that facilitate ARINC 653 configurations.

That is, the object of the present invention is to provide an ARINC 653 configuration method and apparatus that provide a user setting interface, a code template, and code generation rules, assisting in system settings, when carrying out development in compliance with the ARINC 653 standard, thereby improving the convenience and accuracy of ARINC 653 configurations.

In order to accomplish the above object, the present invention provides a method of performing a configuration of an aeronautical system in compliance with an ARINC 653 standard via generation of a source code file, the method including displaying a user interface, and receiving setting information in compliance with the ARINC 653 standard; generating an intermediate model of source code based on the received setting information; creating an Extensible Markup Language (XML) document by performing XML conversion on the generated intermediate model; and generating a source code file in compliance with the ARINC 653 standard by converting the generated XML document.

In order to accomplish the above object, the present invention provides an apparatus for performing a configuration of an aeronautical system, including a display unit display configured to display a user interface for receiving aeronautical system setting information in compliance with an ARINC 653 standard; an intermediate model generation unit configured to generate an intermediate model of source code based on the setting information received via the user interface; an XML conversion unit configured to create an XML document by performing XML conversion on the generated intermediate model; and a translator configured to generate a source code file in compliance with the ARINC 653 standard by converting the generated XML document.

BRIEF DESCRIPTION OF THE DRAWINGS

The above and other objects, features and advantages of the present invention will be more clearly understood from the following detailed description taken in conjunction with the accompanying drawings, in which:

FIG. 3 is a diagram showing ARINC 653 XML schema extension rules according to an embodiment of the present invention;

DESCRIPTION OF THE PREFERRED EMBODIMENTS

Embodiments of the present invention will be described in detail below with reference to the accompanying drawings. Furthermore, the terms "device" and "module" added to elements in the following description are used merely for ease of preparation of the specification. The terms "device" and "module" may be interchangeable and designed in the form of hardware or software.

While the embodiments of the present invention will be described in detail below with reference to the accompanying drawings and the descriptions given in the accompanying drawings, the present invention is not limited to the embodiments of the present invention.

The present invention includes user interfaces for ARINC 653 configurations, a set source code template, and code generation rules for obtaining source code from the user interface, as embodiments.

Figure 1:
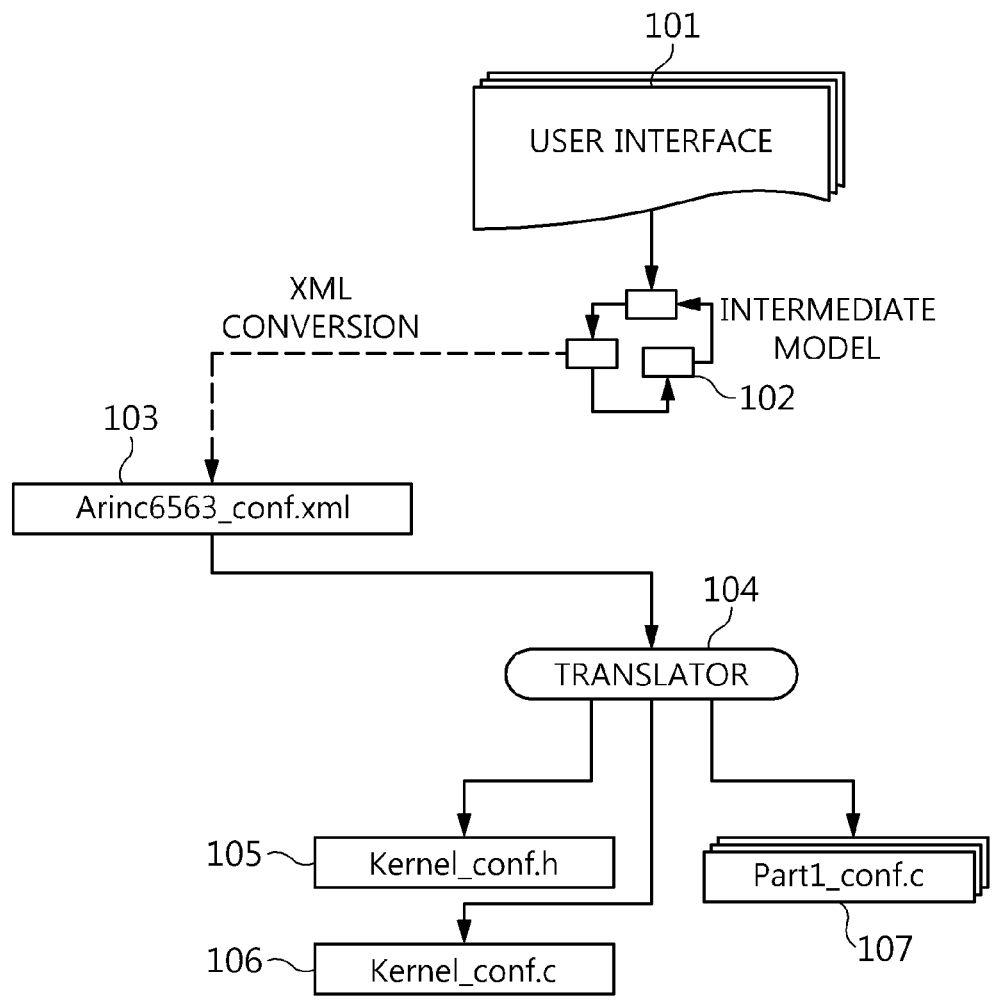
FIG. 1 is a conceptual diagram showing the generation of ARINC 653 configuration code according to an embodiment of the present invention.
Figure 2:
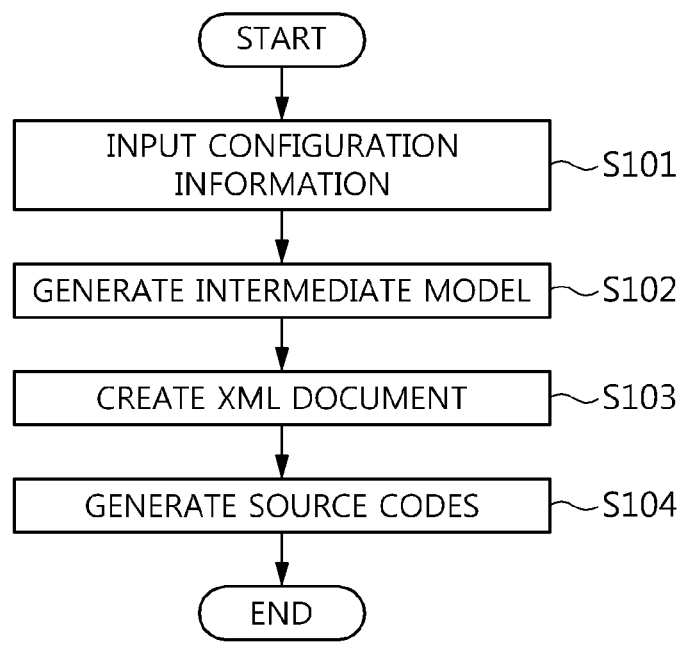
FIG. 2 is a flowchart showing a method of generating ARINC 653 configuration code.

FIG. 1 is a conceptual diagram showing the generation of ARINC 653 configuration code according to an embodiment of the present invention, and FIG. 2 is a flowchart showing the sequence of the generation of the ARINC 653 configuration code.

According to this embodiment, when information about ARINC 653 configuration values is received via the user interfaces 101 at step S101, an intermediate model 102 is first generated and then stored in memory at step S102. Thereafter, XML conversion is performed based on an ARINC 653 XML schema standard, and an XML document 103 is created at step S103. Thereafter, source codes 105, 106, 107, . . . are generated from the XML file via a translator 104 at step S104.

FIG. 3 is a diagram showing ARINC 653 XML schema extension rules according to an embodiment of the present invention.

According to this embodiment, in order to enable a shared input/output (IO) (Shared_IO) function to be set when writing avionics software, the ARINC 653 XML schema standard may be extended, as shown in FIG. 3. ShareIO_List includes one or more shared IO components, and each of the shared IO components includes its name Name, its physical address PhysicalAddress and its size Size as its attributes. It further includes at least one authority component having a partition ID and access as its attributes.

Figure 4:
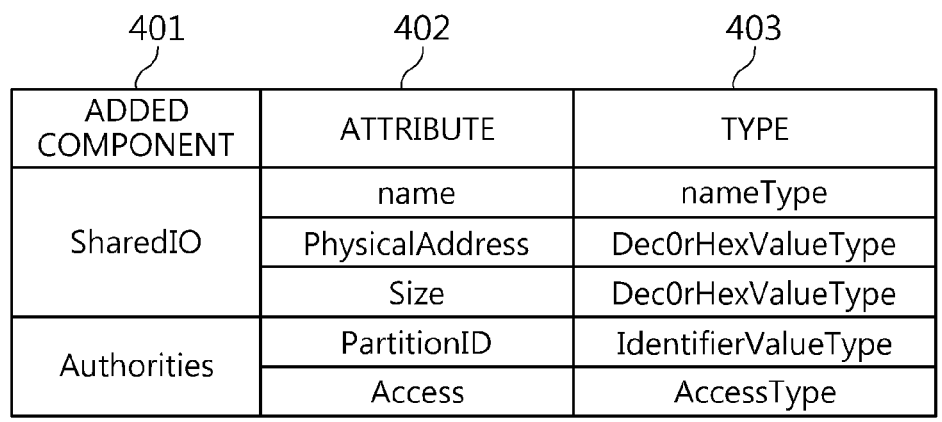
FIG. 4 is a table including information about the attributes and types of added components according to an embodiment of the present invention.

FIG. 4 is a table including information about the attributes 402 and types 403 of added components 401 according to an embodiment of the present invention. That is, in FIG. 4, the types of attributes that added components have are defined in order to extend a schema.

The first and second code paragraphs 301 and 302 of FIG. 3 are portions that are newly defined and added to the existing ARINC 653 XML schema standard according to the embodiment of the present invention, and the remaining portion corresponds to the code of the original ARINC 653 XML schema standard that represents the locations at which the added pieces of code are inserted.

FIGS. 5 to 8 are diagrams showing user interfaces for ARINC 653 configurations according to an embodiment of the present invention. These user interfaces can receive information about extended shared IO components as well as information related to the existing ARINC 653 standard. Furthermore, these user interfaces are based on the master/slave relationship.

Figure 5:
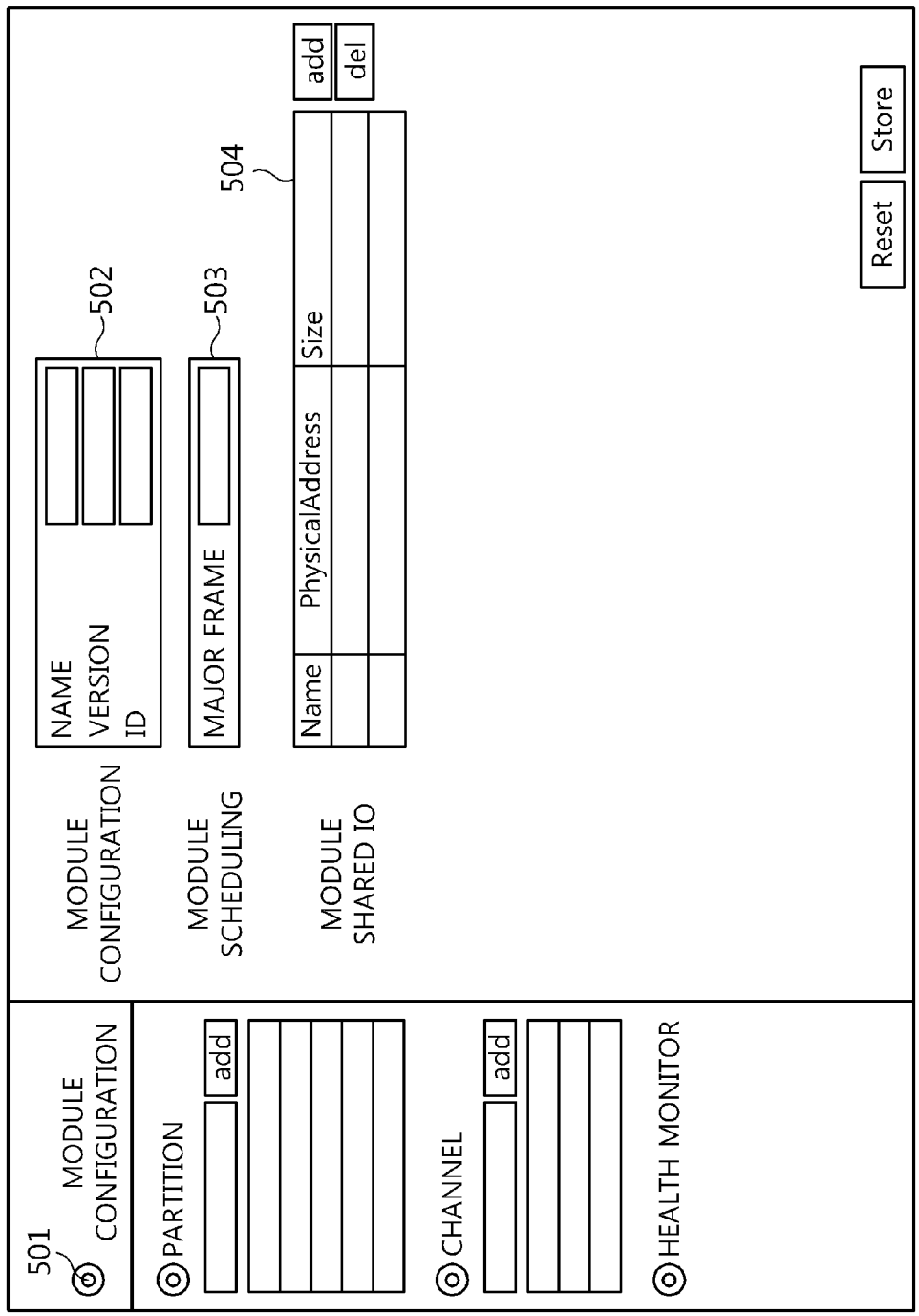
FIG. 5 is a diagram showing a user interface for receiving module configuration information according to an embodiment of the present invention.

FIG. 5 is a diagram showing a user interface for receiving module configuration information according to an embodiment of the present invention.

According to this embodiment, when a user selects a module configuration item 501 from a menu, a user setting interface including a menu item 502 for receiving module configuration information, a menu item 503 for receiving module scheduling information, and a menu item 504 for receiving information about the shared IO component of a module may be displayed.

The menu item 502 for receiving module configuration information may receive information about the name, version and ID of a module.

Furthermore, the menu item 503 for receiving module scheduling information may receive information about important frames. The menu item 504 for receiving information about the shared IO component of a module may receive information about the name, physical address and size of each shared IO component.

Figure 6:
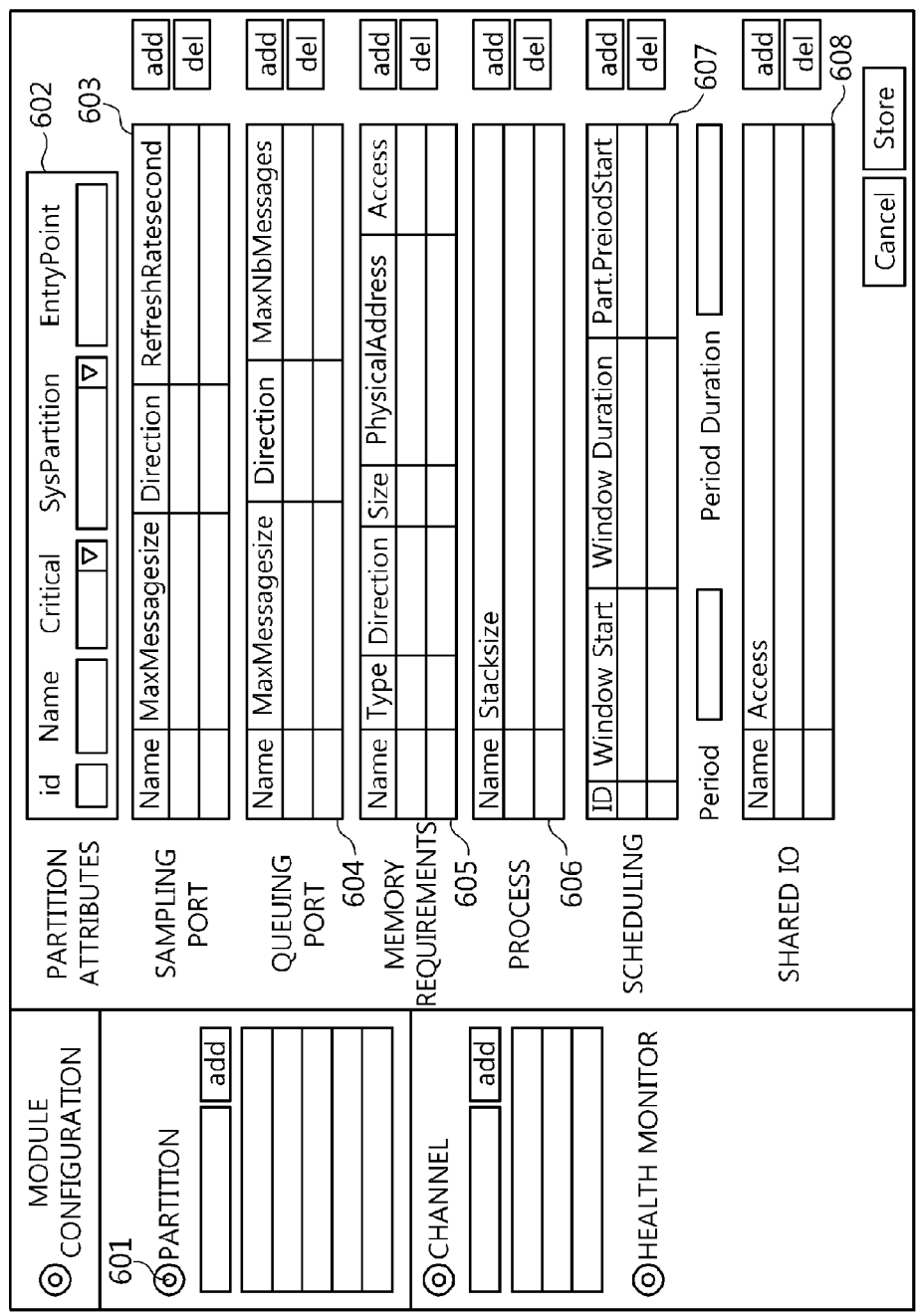
FIG. 6 is a diagram showing a user interface for receiving partition information according to an embodiment of the present invention.

FIG. 6 is a diagram showing a user interface for receiving partition information according to an embodiment of the present invention.

According to this embodiment, when a user selects a partition item 601 from a setting menu, a user setting interface including a menu item 602 for receiving partition attributes information, a menu item 603 for receiving sampling port information, a menu item 604 for receiving queuing port information, a menu item 605 for receiving memory requirement information, a menu item 606 for receiving process information, a menu item 607 for receiving scheduling information, and a menu item 608 for receiving information about a shared IO component may be displayed.

Furthermore, according to this embodiment, the menu item 602 for receiving partition attributes information may receive information about the ID id, name Name, critical Critical, sys-partition SysPartition and entry point EntryPoint of a partition.

The menu item 603 for receiving sampling port information may receive information about a name, the maximum message size MaxMessageSize, a direction Direction and refresh rate time RefreshRateSecond.

The menu item 604 for receiving queuing port information may receive information about a name Name, the maximum message size MaxMessageSize, a direction Direction and the maximum number of messages MaxNbMessage.

The menu item 605 for receiving memory requirement information may receive information about a name Name, a type Type, a direction Direction, a size Size, a physical address PhysicalAddress and access Access.

The menu item 606 for receiving process information may receive information about a name Name and a stack size StackSize.

The menu item 607 for receiving scheduling information may receive information about an ID ID, a window start Window Start, a window duration Window Duration and a partition start Part.PreiodStart.

The menu item 608 for receiving information about a shared IO component may receive information about a name Name and access Access.

Figure 7:
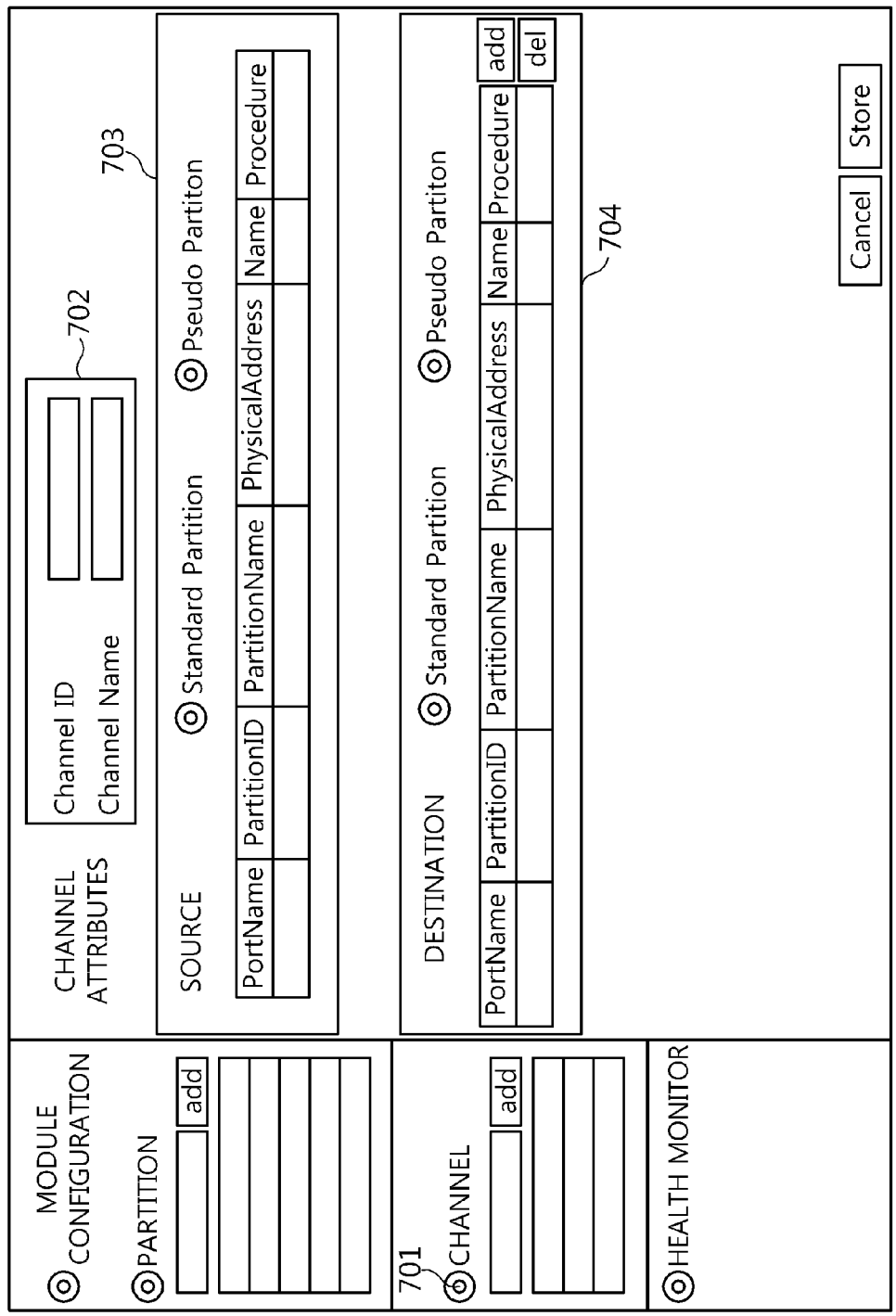
FIG. 7 is a diagram showing a user interface for receiving channel information according to an embodiment of the present invention.

FIG. 7 is a diagram showing a user interface for receiving channel information according to an embodiment of the present invention.

According to this embodiment, when a user selects a channel item 701 from a setting menu, a user setting interface, including a menu item 702 for receiving channel attributes information, a menu item 703 for receiving source information, and a menu item 704 for receiving destination information may be displayed.

Furthermore, according to this embodiment, the menu item 702 for receiving channel attributes information may receive information about the ID and name of a channel.

Furthermore, the menu item 703 for receiving source information may receive information about a selection item capable of the selection of a standard partition or a pseudo partition, a port name PortName, a partition ID PartitionID, a partition name PartitionName, a physical address PhysicalAddress, a name Name, and a procedure Procedure.

Furthermore, the menu item 704 for receiving information about a destination Destination may receive information about a selection item capable of the selection of a standard partition Standard Partition or a pseudo partition Pseudo Partition, a port name PortName, a partition ID PartitionID, a partition name PartitionName, a physical address PhysicalAddress, a name Name, and a procedure Procedure.

Figure 8:
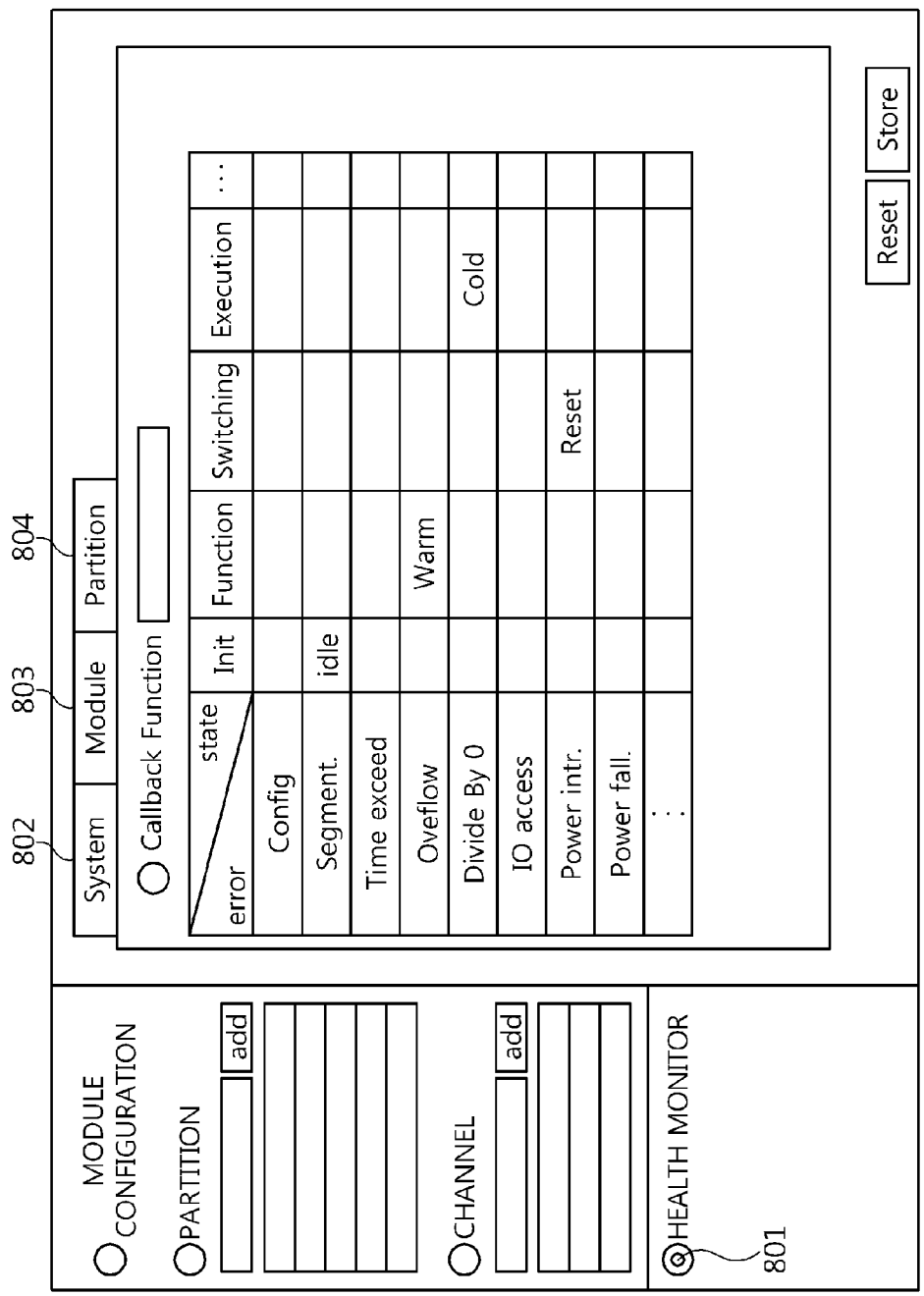
FIG. 8 is a diagram showing a user interface for receiving health monitor information according to an embodiment of the present invention.

FIG. 8 is a diagram showing a user interface for receiving health monitor information according to an embodiment of the present invention.

According to this embodiment, when a user selects a health monitor setting item 801 from a setting menu, a user setting interface, including a system health monitor setting page 802, a module health monitor setting page 803, and a partition health monitor setting page 804, may be displayed.

Each of the pages 802, 803 and 804 may include a menu that is used to receive health monitor setting items.

Figure 9:
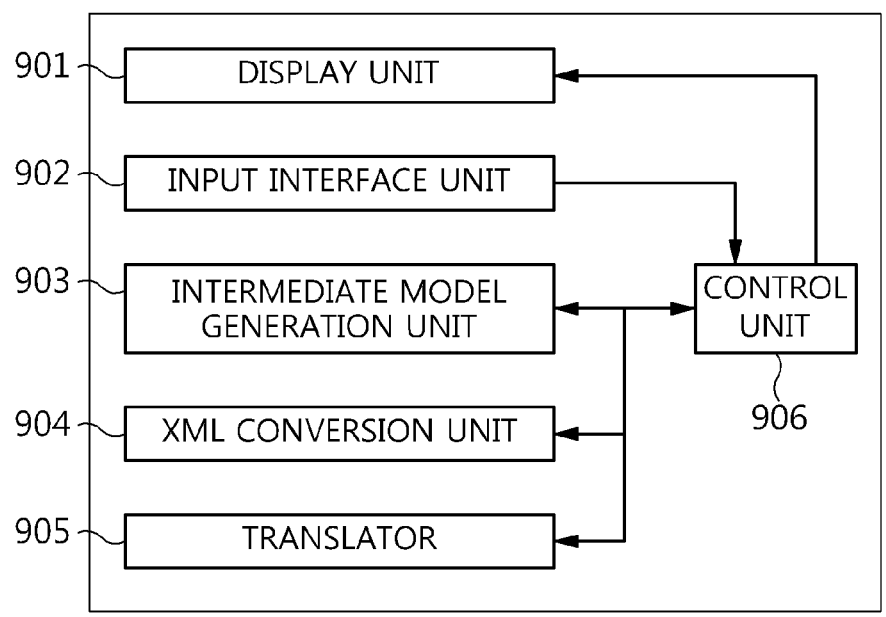
FIG. 9 is a diagram showing the configuration of an RINC 653 setting apparatus according to an embodiment of the present invention.

FIG. 9 is a diagram showing the configuration of an RINC 653 setting apparatus according to an embodiment of the present invention.

According to this embodiment, an ARINC 653 configuration apparatus may include a display unit 901 for displaying a user interface for receiving information about ARINC 653 configurations via an input interface unit 902, an intermediate model generation unit 903 for generating an intermediate model of source code based on the information about settings received via the user interface, an XML conversion unit 904 for creating an XML document by performing XML conversion on the generated intermediate model, and a translator 905 for generating an ARINC 653 source code file by converting the created XML document. Furthermore, the respective units may be controlled via a control unit 906.

Furthermore, the display unit 901 may display a user interface including a menu for receiving at least one piece of setting information that is selected from among module configuration information, partition information, channel information, and health monitor information.

Furthermore, the XML conversion unit 904 may use an extended ARINC 653 XML schema standard that enables a shared IO function to be set.

Furthermore, the translator 905 may generate the ARINC 653 source code file in a form corresponding to a preset source code template, and may create the ARINC 653 source code file in a form corresponding to the preset source code template based on preset source code conversion rules.

A source code template and code generation rules according to an embodiment of the present invention will be described in detail below.

That is, in the following description, the source code template will be defined along with simple descriptions, and rules that convert an XML file in which set values have been stored into source code which complies with the template will also be described. Each of the rules will be described on the assumption that an XML file has been given.

Furthermore, in the following description, the sign "< >" indicates an XML tag, and represents a set of corresponding tags in an input XML file.

That is, <Partition> that is used in the following description of rules means a set of all partition tags that is declared in an input XML file. If p∈<Partition>, this means that p is one of partition tags. p.PartitionIdentifier means the value of a partition ID attribute that belongs to tag p. Furthermore, || is used as a sign indicative of the number of sets. That is, |<Partition>| means the number of all <Partition> tags that are present in a given XML file. Furthermore, p.<Process> means a set of process tags that belong to partition p. <Process> without a prefix means a set of all process tags in an XML file. When conversion rules are defined below, data types, such as reserved words and arrays, for example, "print," "if" or the like, that are used in general high-level languages are used. In particular, "for each" means application to all the elements of a corresponding set, and "some" means application to some element(s) of a corresponding set. Accordingly, when a "some" syntax is applied to a set having a single element, the "some" indicates the corresponding element. That is, when for each p∈<Partition> { . . . }, it means that the processing within { } is applied to each element p of a partition tag set. When some s∈<Source>{ . . . }, it means that the processing within { } is applied to some element(s) s of a source tag. Here, since <Source> appears once per channel tag, "s" is a singular value. A comma (,) used in a print statement means string-join. In order to define a function, the form of func function_name par1, . . . , parN{ . . . } is used. As in a general high-level language, the returning of a return value is defined using a return syntax. The sign "-" is used for comments.

First, the configurations included in Kernel_Conf.h file will be described below.

(1) NEEDS_PARTITIONS

NEEDS_PARTITIONS is a macro that indicates that partitioning services are needed, and implies that the configuration macros and variables for the partitioning services are defined.

[Conversion Rule]
print "#define NEEDS_PARTITIONS 1"

(2) NEEDS_SCHED

NEEDS_SCHED is a macro that indicates that a scheduler is needed.

[Conversion Rule]
print "#define NEEDS_SCHED 1"

(3) NEEDS_IO

NEEDS_IO is a macro that indicates that IO services must be activated, so that some partitions are made to perform IO.

```
[Conversion Rule]
#define NEEDS_IO  1
```

(4) NEEDS_PORTS_SAMPLING

NEEDS_PROTS_SAMPLING implies that a sampling port service for inter-partition communication is included.

```
[Conversion Rule]
if (|<Sampling_Port>|> 0){
print "#define NEEDS_PORTS_SAMPLING 1"
}
```

(5) NEEDS_PORTS_QUEUEING

A queuing port service for inter-partition communication is needed.

```
[Conversion Rule]
if (|<Queueing_Port>|> 0){
print "#define NEEDS_PORTS_QUEUEING 1"
}
```

(6) CONFIG_NB_THREADS

CONFIG_NB_THREADS specifies the number of threads in a system. This represents how many threads can be handled in a kernel. Furthermore, the number of threads is computed like this: the number of threads in the system+2. Furthermore, in this macro, two threads, that is, a kernel thread and an idle thread, are added. Here, the thread means the process of an ARINC 653 partition.

```
[Conversion Rule]
print "#define CONFIG_NB_THREADS ", |<Process>| + 2
```

(7) CONFIG_NB_PARTITIONS

CONFIG_NB_PARTITIONS is a macro that specifies the number of partitions that are handled in the kernel.

```
[Conversion Rule]
print "#define CONFIG_NB_PARTITIONS ", |<Partition>|
```

(8) CONFIG_PARTITIONS_NTHREADS

CONFIG_PARTITIONS_NTHREADS is a macro that specifies how many threads reside in partitions. This macro is an array. Each index of this array represents a partition. Each value represents the number of threads of a corresponding partition. The following embodiment is a code that represents four partitions that have 2, 2, 2, and 4, respectively.

```
#define CONFIG_PARTITIONS_NTHREADS {2, 2, 2, 4}
[Conversion Rule]
print "#define CONFIG_PARTITIONS_NTHREADS {"
count = 0
for each p ∈ <Partition> {
print |<Process>|
  count = count + 1
if (count <|<Partition>|){ print ","}
}
print "}"
```

(9) CONFIG_SCHEDULERING_MAJOR_FRAME

CONFIG_SCHEDULERING_MAJOR_FRAME specifies a major frame. The major frame is the time when inter-partition ports are flushed. This corresponds to the end of a scheduling cycle. In the following scheduling setting example, four slots of 500 ms are declared. A first slot is for a first partition, a second slot is for a second partition and so on. The major frame is 2 s.

```
#define CONFIG_PARTITIONS_NTHREADS {2, 2, 2, 4}
[Conversion Rule]
for each ms ∈ <Module_Schedule>{
mfs = ms.MajorFrameSeconds
print "#define CONFIG_SCHEDULERING_MAJOR_FRAME", mfs
}
```

(10) CONFIG_SCHEDULERING_NBSLOTS

CONFIG_SCHEDULERING_NBSLOTS specifies the number of time frames allocated for the execution of partitions.

```
#define CONFIG_SCHEDULERING_NBSLOTS 4
[Conversion Rule]
number = |<Window_Schedule>|
print "#define CONFIG_SCHEDULERING_NBSLOTS", number
```

(11) CONFIG_SCHEDULERING_SLOTS

CONFIG_SCHEDULERING_SLOTS specifies the size of each slot in milliseconds.

```
#define CONFIG_SCHEDULERING_SLOTS {500, 500, 500, 500}
[Conversion Rule]
print "#define CONFIG_SCHEDULERING_SLOTS {"
count = 0
for each w ∈ <Window_Schedule> {
print w.WindowDurationSecond * 1000
count = count + 1
  if (count < |<Window_Schedule>|){ print ","}
}
print "}"
```

(12) CONFIG_SCHEDULERING_SLOTS_ALLOCATION

CONFIG_SCHEDULERING_SLOTS_ALLOCATION specifies the allocation of each slot. It may be declared using an array. Each index of the array represents a partition, and each value represents each slot

```
#define CONFIG_SCHEDULERING_SLOTS_ALLOCATION {0, 1, 2, 3}
[Conversion Rule]
print "#define CONFIG_SCHEDULERING_SLOTS_ALLOCATION {"
count = 0
for each ps ∈ <Partition_Schedule> {
for each ps.<Window_Schedule> {
print ps.PartitionIdentifier
count = count + 1
  if (count < |<Window_Schedule>|){ print ","}
}
}
print "}"
```

(13) CONFIG_PARTITIONS_SME

CONFIG_PARTITIONS_SME specifies an array with partition sizes in bytes. Each index of an array represents a partition, and each value represents the size of the partition. The following example means that first three partitions have a size of 80000 bytes and the last partition has a size of 85000 bytes.

```
#define CONFIG_PARTITIONS_SIZE {80000, 80000, 80000, 85000}
[Conversion Rule]
print "#define CONFIG_PARTITIONS_SIZE {"
count = 0
for each p ∈ <Partition> {
    size = 0
    for each pm ∈ <Partition_Memory> {
        if (p.PartitionName == pm.PartitionName){
            for each mr ∈ pm.<Memory_Requirement> {
                size = size + mr.SizeBytes
            }
        }
    }
    print size
    count = count + 1
    if (count < |<Partition>|){ print "," }
}
print "}"
```

(14) CONFIG_LOCAL_NODE

CONFIG_LOCAL_NODE specifies the ID of a current node.

```
[Conversion Rule]
print "#define CONFIG_LOCAL_NODE 0"
```

(15) CONFIG_NB_GLOBAL_PORTS

CONFIG_NB_GLOBAL_PORTS is a macro that specifies the number of global ports in a distributed system.

```
[Conversion Rule]
number = |<Queueing_Port>| + |<Sampling_Port>|
print "#define CONFIG_NB_GLOBAL_PORTS", number
```

(16) CONFIG_NB_PORTS

CONFIG_NB_PORTS is a macro that specifies the number of local ports in a current node.

```
[Conversion Rule]
number = |<Queueing_Port>| + |<Sampling_Port>|
print "#define CONFIG_NB_PORTS", number
```

(17) port_local_identifier_t port_local_identifier_t means a type that represent local port IDs declared in an 'enum'. An invalid ID called 'invalid_identifier' must always be added to the type. This 'enum' declaration specifies the local ports of a current node and, consequently, is dependent on the communication requirements of each node.

```
typedef enum
{node1_partition_secret_outgoing     = 0,
 node1_partition_topsecret_outgoing  = 1,
 node1_partition_unclassified_outgoing = 2,
 invalid_local_port = 3} port_local_indentitier_t;
    [Conversion Rule]
    max = |<Queueing_Port>| + |<Sampling_Port>|
    if (max > 0){
        pID = -1
        print "typedef enum {"
        for each p ∈ <Partition> {
            for each qp ∈ p.<Queueing_Port> {
                pID = pID + 1
                print "p", p.PartitionIdentifier, "_", qp. PortName,"=", pID, ","
            }
            for each sp ∈ p.<Sampling_Port> {
                pID = pID + 1
                print "p", p.PartitionIdentifier,"_", sp. PortName,"=", pID, ","
            }
        }
        pID = pID + 1;
        print "invalid_local_port = ", pID
        print "} port_local_identifier_t;"
    } else {
        ERROR! - error occurred (no port)
    }
```

(18) port_identifier_t

A global port identifier is specified by declaring an 'enum' type. This enum declaration must be the same on all nodes.

```
typedef enum     {node1_partition_secret_outgoing_global     = 0,
node1_partition_topsecret_outgoing_global                    = 1,
node1_partition_unclassified_outgoing_global                 = 2,
node2_partition_secret_incoming_global                       = 3,
node2_partition_topsecret_incoming_global                    = 4,
node2_partition_unclassified_incoming_global = 5,} port_indentitier_t;
    [Conversion Rule]
    max = |<Queueing_Port>| + |<Sampling_Port>|
    if (max > 0){
    pID = -1
    print "typedef enum {"
    for each p ∈ <Partition> {
        for each qp ∈ p.<Queueing_Port> {
            pID = pID + 1
    print "p", p.PartitionIdentifier,"_",
    qp. PortName,"_global = ", pID
            if (max > pID+1){ print "," }
        }
        for each sp ∈ p.<Sampling_Port> {
        pID = pID + 1
        print "p", p.PartitionIdentifier,"_", sp. PortName,"_global = ",
        pID
            if (max > pID+1){ print "," }
        }
    }
    print "} port_identifier_t;"
```

```
        } else {
        ERROR! -- error occurred (no port)
        }
```

(19) node_identifier_t node_identifier_t is a type that specifies a node identifier. The type contains the value of each node. The value of 'CONFIG_LOCAL_NODE' must be in this type. This enum declaration is the same on all nodes. An example thereof is as follows:

```
        typedef enum {node1 = 0, node2 = 1 } node_indentitier_t;
        [Conversion Rule]
        print "typedef enum {"
        print " node1 = 0"
        print "} node_identifier-t;"
```

(20) Config_NB_Shared_IO

CONFIG_NB_SHARED_IO is a macro that means the number of shared IOs. In a kernel source file, information about set Shared IOs is indicated.

```
        [Conversion Rule]
        number = the number of <SharedIO> tags
        print "#define CONFIG_NB_SHARED_IO ", number
```

(21) table_t declaration

```
[Conversion Rule]
print "table_t    system_hm_table;"
print "table_t    module_hm_table;"
print "table_t    partition_hm_table[CONFIG_NB_PARTITIONS];"
```

Second, the configurations included in Kernel_Conf.cfile will be described below.

(1) ports_identifiers ports_identifiers is an array that specifies the global port of each local port. In the following embodiment, the first local port of a current node is the global port 'node1_partition_secret_outgoing.'

```
        unit8_t    ports_identifiers[CONFIG_NB_PORTS]    =
{node1_partition_secret_outgoing,
node1_partition_topsecret_outgoing,
node1_partition_unclassified_outgoing};
        [Conversion Rule]
        max = |<Queueing_Port>| + |<Sampling_Port>|
        if (max > 0){
          count = 0
          print "unit8_t ports_identifiers[CONFIG_NB_PORTS] = {"
          for each p ∈ <Partition> {
            for each qp ∈ p.<Queueing_Port> {
              count = count + 1
              print "p", p.PartitionIdentifier, "_", qp.PortName
                if (max > count){ print ","}
            }
            for each sp ∈ p.<Sampling_Port> {
              count = count + 1
              print "p", p.PartitionIdentifier,"_", sp.PortName
                if (max > count){ print ","}
            }
          }
          print "};"
```

```
        } else {
        ERROR! -- error occurred (no port)
        }
```

(2) prots_nb_destinations prots_nb_destinations is an array that specifies the number of destinations for each local port. prots_nb_destinations specifies how many ports should receive data because a plurality of receptions are possible for a single transmission port.

```
[Conversion Rule]
func getDestNumber pName{
  for each c ∈ <Channel> {
    some s ∈ c.<Source> {
    if (|s.<Standard_Partition>| != 0){
    some spa ∈ s.<Standard_Partition>{
    if (pName == spa.PortName){
    return |c.<Destination>|
    }
    }
    }
      }
  }
  return −1
}
max = |<Queueing_Port>| + |<Sampling_Port>|
if (max > 0){
print "unit8_t ports_nb_destinations[CONFIG_NB_PORTS] = {"
count = 0
for each p ∈ <Partition> {
  for each qp ∈ p.<Queueing_Port> {
    if (qp.Direction == "DESTINATION"){
  print 0
    }else{
      number_ds = getDestNumber(qp.PortName)
      if (number_ds < 1) {
        ERROR! -- port and channel definition error
      }else{
        print number_ds
      }
    }
  count = count + 1
    if (max > count){ print ","}
  }
  for each sp ∈ p.<Sampling_Port> {
    if (sp.Direction == "DESTINATION"){
  print 0
    }else{
      number_ds = getDestNumber (sp.PortName)
      if (number_ds < 1) {
        ERROR! -- port and channel definition error
      }else{
        print number_ds
      }
    }
  count = count + 1
    if (max > count){ print ","}
  }
}
print "};"
} else {
ERROR! - error occurred (no port)
}
```

(3) ports_destinations ports_destinations is an array that specifies a local port routing policy. Each value of this array is a pointer to another array. The array that is connected by pointers contains the values of recipient global ports. In the following example, a first local port has one recipient. The recipient list is specified with the first elements of the 'ports_destinations' array. These elements are the 'node1_partition_secret_outgoing_deployment_destinations' array. In this manner, it can be seen that a recipient port identifier is 'node2_partition secert_incoming_global.'

```
        uint8_t     node1_partition_secret_outgoing_deployment_destinations[1]    =
{node2_partition_secret_incoming_global};
        uint8_t     node1_partition_topsecret_outgoing_deployment_destinations[1]    =
{node2_partition_topsecret_incoming_global};
        uint8_t     node1_partition_unclassified_outgoing_deployment_destinations[1]
={node2_partition_unclassified_incoming_global};
        uint8_t ports_nb_destinations[CONFIG_NB_PORTS] = {1,1,1};
        uint8_t*                            ports_destinations[CONFIG_NB_PORTS]
={node1_partition_secret_outgoing_deployment_destinations,
node1_partition_topsecret_outgoing_deployment_destinations,
node1_partition_unclassified_outgoing_deployment_destinations};
        [Conversion Rule]
        -- array pointer ports_destinations generation
        max = |<Queueing_Port>| + |<Sampling_Port>|
        if (max > 0){
        print "uint8_t* ports_destinations[CONFIG_NB_PORTS] = {"
        count = 0
for each p ∈ <Partition> {
  for each qp ∈ p.<Queueing_Port> {
    if (qp.Direction == "DESTINATION") {
print "NULL"
    }else{
      print "p", p.PartitionIdentifier, "_", qp.PortName, "_destinations"
    }
count = count + 1
    if (max > count){ print ","}
}
  for each sp ∈ p.<Sampling_Port> {
if (sp.Direction == "DESTINATION") {
print "NULL"
    }else{
      print "p", p.PartitionIdentifier, "_", sp.PortName, "_destinations"
    }
count = count + 1
    if (max > count){ print ","}
  }
}
print "};"
} else {
 ERROR! -- error occurred (no port)
}
        func findDestination (pName){
        for each c ∈ <Channel> {
            some s ∈ c.<Source>{
        if (|s.<Standard_Partition>| != 0){
        some spa ∈ s.<Standard_Partition>{
        if (pName == spa.PortName) {
        return c.<Destination>
        }
        }
        }
        }
            }
        }
        return { }
        }
        -- generate an array that belongs to ports_destinations
        if (max > 0){
        for each p ∈ <Partition> {
           for each qp ∈ p.<Queueing_Port> {
              flag = 0
              if (qp.Direction == "SOURCE") {
             print "unit8_t p", p.PartitionIdentifier, "_", qp.PortName, "_destinations[",
getDestNumber(qp.PortName), "] = {"
        foreach dest ∈ findDestination(qp.PortName) {
          foreach spa ∈ dest.<Standard_Partition> {
             if (flag = 1) { print ", "}
             print "p", p.PartitionIdentifier, "_", spa.PortName
             flag = 1
          }
        }
        print "};"
            }
        }
          for each sp ∈ p.<Sampling_Port> {
             flag = 0
```

```
        if (sp.Direction == "SOURCE") {
    print "uint8_t p", p.PartitionIdentifier, "_", sp.PortName, "_destinations[",
getDestNumber (sp.PortName), "] = {"
        foreach dest ∈ findDestination (sp.PortName) {
            foreach spa ∈ dest.<Standard_Partition> {
                if (flag = 1) { print ","}
                print "p", p.PartitionIdentifier, "_", spa.PortName
                flag = 1
            }
        }
        print "};"
            }
        }
    }
    } else {
    ERROR! -- error occurred (no port)
    }
```

(4) local_ports_to_global_ports local_ports_to_global_ports is an array that performs the association (conversion) between each local and global port. The associated global port value is specified for each local port ID. In the following example, the first local port corresponds to the global port ID 'node1_partition_secret_outgoing_global.'

```
uint8_t
local_ports_to_global_ports[CONFIG_NB_PORTS]
={node1_partition_secret_outgoing_global,
  node1_partition_topsecret_outgoing_global,
  node1_partition_unclassified_outgoing_global};
    [Conversion Rule]
    max = |<Queueing_Port>| + |<Sampling_Port>|
    if (max > 0){
        count = 0
        print "uint8_t global_ports_to_local_ports-
CONFIG_NB_PORTS] = {"
        for each p ∈ <Partition> {
            for each qp ∈ p.<Queueing_Port> {
                count = count + 1
                print "p", p.PartitionIdentifier, "_", qp.PortName, "_global"
                    if (max > count) { print ","}
            }
            for each sp ∈ p.<Sampling_Port> {
                count = count + 1
                print "p", p.PartitionIdentifier, "_", sp.PortName, "_global"
                    if (max > count){ print ","}
            }
        }
        print "};"
    } else {
    ERROR! -- error occurred (no port)
    }
```

(5) global_ports_to_local_ports

When it is necessary to convert a global port value to a local port, an invalid_port value is specified if the global port is not on a current node because the definition of this array is different on all nodes. From the following embodiment, it can be seen that the three last ports are not located on the current node.

```
uint8_t   global_ports_to_local_ports-
[CONFIG_NB_GLOBAL_PORTS]  =
{node1_partition_secret_outgoing,
 node1_partition_topsecret_outgoing,
 node1_partition_unclassified_outgoing,
 invalid_local_port, invalid_local_port, invalid_local_port};
    [Conversion Rule]
    max = |<Queueing_Port>| + |<Sampling_Port>|
    if (max > 0){
        count = 0
        print "uint8_t local_ports_to_global_ports-
[CONFIG_NB_PORTS] = {"
        for each p ∈ <Partition> {
            for each qp ∈ p.<Queueing_Port> {
                count = count + 1
                print "p", p.PartitionIdentifier, "_", qp.PortName
                    if (max > count){ print ","}
            }
            for each sp ∈ p.<Sampling_Port> {
                count = count + 1
                print "p", p.PartitionIdentifier, "_", sp.PortName
                    if (max > count){ print ","}
            }
        }
        print "};"
    } else {
    ERROR! -- error occurred (no port)
    }
```

(6) ports_nodes

The location of each global port is specified with this array. This array associates each port with a node identifier. In the following example, it can be seen that three global ports are located on node 0 and the remaining three global ports are located on node 1.

```
uint8_t ports_nodes[CONFIG_NB_GLOBAL_PORTS] =
{0,0,0,1,1,1};
    [Conversion Rule]
    max = |<Queueing_Port>| + |<Sampling_Port>|
    if (max > 0){
        count = 0
        print "uint8_t ports_nodes[CONFIG_NB_PORTS] = {"
        for each p ∈ <Partition> {
            for each qp ∈ p.<Queueing_Port> {
                count = count + 1
                print 0
                    if (max > count){ print ","}
            }
            for each sp ∈ p.<Sampling_Port> {
                count = count + 1
                print 0
                    if (max > count){ print ","}
            }
        }
        print "};"
    } else {
    ERROR! -- error occurred (no port)
    }
```

(7) ports_kind

The kernel must know the kind of each port (queuing or sampling). That requirement is specified with a 'pok_ports_kind' array. In the following example, three local ports are all specified as the sampling port type.

```
port_kind_t    ports_kind[CONFIG_NB_PORTS]    =
{PORT_KIND_SAMPLING,         PORT_KIND_SAMPLING,
PORT_KIND_SAMPLING};
    [Conversion Rule]
    max = |<Queueing_Port>| + |<Sampling_Port>|
    if (max > 0){
        count = 0
        print "uint8_t ports_kind[CONFIG_NB_PORTS] = {"
        for each p ∈ <Partition> {
            for each qp ∈ p.<Queueing_Port> {
                count = count + 1
                print "PORT_KIND_QUEUEING"
                if (max > count) {print ","}
            }
            for each sp ∈ p.<Sampling_Port> {
                count = count + 1
                print "PORT_KIND_SAMPLING"
                if (max > count){ print ","}
            }
        }
        print "};"
    } else {
        ERROR! -- error occurred (no port)
    }
```

(8) ports_names

When a develop calls port instantiation, a port name can be specified. For this reason, the kernel must know the name associated with each port. This information is provided by the ports_names declaration. This array contains the name of each local port. The following example is an example in which the name of a port is specified.

```
port_kind_t    ports_names[CONFIG_NB_PORTS]   =
{"node1_partition_secret_outgoing",
"node1_partition_topsecret_outgoing",
"node1_partition_unclassified_outgoing"};
    [Conversion Rule]
    max = |<Queueing_Port>| + |<Sampling_Port>|
    if (max > 0) {
        count = 0
        print "char* ports_names[CONFIG_NB_PORTS] = {"
        for each p ∈ <Partition> {
            for each qp ∈ p.<Queueing_Port> {
                count = count + 1
                print """p", p.PartitionIdentifier, "_", qp.PortName, """"
                if (max > count) { print ","}
            }
            for each sp ∈ p.<Sampling_Port> {
                count = count + 1
                print """p", p.PartitionIdentifier, "_", sp.PortName, """"
                if (max > count) {print ","}
            }
        }
```

```
        }
        print "};"
    } else {
        ERROR! -- error occurred (no port)
    }
```

(9) ports_nb_ports_by_partition

The inter-partition communication ports are dedicated to some partitions. Therefore, which partition is allowed to read/write which port should be specified. Two arrays are required. This variable is an array that identifies the number of ports allocated for each partition.

```
[Conversion Rule]
-- the number of ports for each partition
print "uint8_t ports_nb_ports_by_partition
[CONFIG_NB_PARTITIONS] = {"
count = 0;
for each p ∈ <Partition> {
    count = count + 1
    print |p.<Queueing_Port>| + |p.<Sampling_Port>|
        if (|<Partition>| > count) {print ","}
}
print "};"
-- a port name for each partition
for each p ∈ <Partition> {
partNum = |p.<Queueing_Port>| + |p.<Sampling_Port>|
print "uint8_t p", p.PartitionIdentifier, "_partport[", partNum, "] = {"
flag = 0
for each qp ∈ p.<Queueing_Port> {
    if (flag == 1) { print ","}
    print "p", p.PartitionIdentifier, "_", qp.PortName
        flag = 1
}
flag = 0
for each sp ∈ p.<Sampling_Port> {
    if (flag == 1) { print ","}
    print "p", p.PartitionIdentifier, "_", sp.PortName
        flag = 1
}
    print "};"
}
```

(10) ports_by_partition

This variable is an array that contains global port identifiers allowed for a corresponding partition. In the following example, a first partition has one port whose identifier is node1_partition_secret_outgoing. The number of partitions is three, and each of the partitions has one global port.

```
        uint8_t    node1_partition_secret_partport[1]    =
{node1_partition_secret_outgoing};
        uint8_t    node1_partition_topsecret_partport[1]   =
{node1_partition_topsecret_outgoing};
        uint8_t    node1_partition_unclassified_partport[1]  =
{node1_partition_unclassified_outgoing};
        uint8_t ports_nb_ports_by_partition[CONFIG_NB_PARTITIONS] = {1,1,1};
        uint8_t*    ports_by_partition[CONFIG_NB_PARTITIONS]
={node1_partition_secret_partport,node1_partition_topsecret_partport,node1_partition_unclassified_partport};
        [Conversion Rule]
        print "uint8_t* ports_by_partition[CONFIG_NB_PARTITIONS] = {"
        count = 0;
        for each p ∈ <Partition> {
```

```
count = count + 1
print "p", p.PartitionIdentifier, "_partport"
    if (|<Partition>| > count) {, print ","}
}
print "};"
```

(11) shared_io

In order to define shared IO, the following header file sharedio.h should be first defined. This header file defines a structure in which set values will be stored.

(11-1) sharedio.h

```
#define NAME_LENGTH 30
typedef struct
{
    SHARED_IO_ACCESS_TYPE
    shared_io_auth[CONFIG_NB_PARTITIONS]
    char        name[NAME_LENGTH];
    void        * addr;
    UINT32      size;
} shared_io_t;
typedef enum {
    NONE,
    READ_ONLY,
    WRITE_ONLY,
    READ_WRITE
} SHARED_IO_ACCESS_TYPE;
```

(11-2) Kernel-conf.c source code may be written as described below.

Furthermore, the Kernel-conf.c source code represents information about shared IO. Furthermore, a number of values of the shared_io_t type, that is, the access authorities of the partitions for each shared IO and shared IOs own attributes, equal to the number of shared IOs defined in the header file, are described in a single array.

```
shared_io_t shared_io[CONFIG_NB_SHARED_IO] = {
{
sharedIO1_authorities,
sharedIO1, 0x001c0030, 40},
{
sharedIO2_authorities,
sharedIO2, 0x0ff00000, 100},
...
}
SHARED_IO_ACCESS_TYPE sharedIO1_authorities[3] ={
NONE, READ_ONLY, WRITE_ONLY}
SHARED_IO_ACCESS_TYPE sharedIO2_authorities[3] ={
NONE, NONE, WRITE_ONLY}
...
[Conversion Rule]
-- generate access authorities array for each shared IO
for each sio ∈ <SahredIO> {
print "SHARED_IO_ACCESS_TYPE ", sio.Name,
"_Authorities[", CONFIG_NB_PARTITIONS, "] = {"
    count = 0
    for each p ∈ <Partition> {
        flag = 0;
        for each a ∈ sio.<Authorities> {
            if (p.PartitionIdentifier == a.PartitionID) {
                print a.Access
                flag = 1
            }
        }
        if (flag == 0) {print "NONE" }
        count = count + 1
        if (|<Partition>| > count) { print ","}
    }
    print "};"
}
```

```
-- generate the shared IO array
count =0
print "shared_io_t shared_io[CONFIG_NB_SHARED_IO] = {"
for each sio ∈ <SahredIO> {
    count = count + 1
    print "{", sio.Name, "_Authorities, ", sio.PhysicalAddress, ",",
    sio.Size
    if (|<SahredIO>| > count) {print "},"} else { print "}"}
}
print "};"
```

(12) hm_table_init

In order to represent set values for a health monitor (HM), the following types should be defined in the header file 'erroth' in advance.

(12-1) Codes representing the states of the system and types representative of errors that may occur in the system

```
#define NB_SYSTEM_STATE 5
typedef enum
{
    MODULE_INIT, PARTITION_SWITCHING,
    PARTITION_INIT, PROCESS_EXECUTION,
    OS_EXECUTION
} system_state_t;
#define NB_ERROR_ID 19
typedef enum
{
    DIVIDE_ERROR, DEBUG, NMI, BREAKPOINT,
    OVERFLOW,
    BOUND_RANGE,    INVALID_OPCODE,
    NOMATH_COPROC,
    DOUBLE_FAULT,
        COPSEG_OVERRUN, INVALID_TSS,
        SEGMENT_NOT_PRESENT,
        STACK_SEG_FAULT,    GENERAL_PROTECTION,
        PAGEFAULT,
    FPU_FAULT,
        ALIGNEMENT_CHECK, MACHINE_CHECK,
        SIMD_FAULT
} error_id_t;
```

(12-2) Codes representing error levels to be used in a system HM table and error actions to be used in a module HM table and a partition HM table

```
typedef enum
{
    NONE, MODULE_LEVEL, PARTITION_LEVEL,
    DEADLINE_MISSED, APPLICATION_ERROR,
    NUMERIC_ERROR, ILLEGAL_REQUEST,
    POWER_FAIL,    MEMORY_VIOLATION,
    HARDWARE_FAULT,
    STACK_OVERFLOW
} error_level_t;
typedef enum
{
    M_NONE, M_RESET, M_SHUTDOWN, M_IGNORE
} module_action_t;
typedef enum
{
    P_NONE, P_IDLE, P_WARM_START, P_COLD_START,
```

```
        P_IGNORE
} partition_action_t;
```

(12-3) Codes defining the 'struct' type representing the structure of the HM table

```
typedef struct {
union{
error_level_t     system[NB_ERROR_ID][NB_SYSTEM_STATE];
module_action_t   module[NB_ERROR_ID] [NB_SYSTEM_STATE];
partition_action_t partition[NB_ERROR_ID][NB_SYSTEM_STATE];
} table;
void (*callback) (uint32_t);
} table_t;
```

Furthermore, 'NB_ERROR_ID' and 'NB_SYSTEM_STATE' used in the codes represent the number of elements of the type 'system_state_t' and the number of elements of the type 'error_id_t'. 'callback' represents a user-defined callback function. When the 'error.h' header file is declared as described above, the following partition table information is declared in the 'Kernel-conf.h' header file.

(12-4) Partition table information declaration

```
table_t    system_hm_table;
table_t    module_hm_table;
table_t    partition_hm_table[CONFIG_NB_PARTITIONS];
```

Furthermore, in Kernel-conf.c, the following HM table initiation function is written. In the initiation function, all the values of the HM tables are initialized to NONE.

(12-5) HM table initiation function

```
void hm_table_init
{
  int i, j, k;
  for (i = 0; i < CONFIG_NB_ERROR_ID; i++)
  {
    for (j = 0; j < CONFIG_NB_SYSTEM_STATE; j++)
    {
      system_hm_table.table.system[i][j] = NONE;
      module_hm_table.table.module[i][j] = M_NONE;
      for (k = 0; k < CONFIG_NB_PARTITIONS; k++)
        partition_hm_table[k].table.partition [i][j] = P_NONE;
    }
  }
}
```

Finally, the following code is written in the Kernel-conf.c based on the values set in the MI table.

(12-6) Codes based on values set in HM table

```
system_hm_table.table.system[OVERFLOW][MODULE_INIT]      =
MODULE_LEVEL;
module_hm_table.table.module[OVERFLOW][MODULE_INIT]      =
M_RESET;
system_hm_table.table.system[OVERFLOW][PARTITION_INIT]   =
PARTITION_LEVEL;
module_hm_table.table.module[OVERFLOW][PARTITION_INIT]   =
P_COLD_START
...
[Conversion Rule]
print "void hm_table_init {"
print " int i, j, k;"
print " for (i = 0; i < NB_ERROR_ID; i++) {"
print "    for (j = 0; j < NB_SYSTEM_STATE; j++) {"
print "      system_hm_table.table.system[i][j] = NONE;"
print "      module_hm_table.table.module[i][j] = M_NONE;"
print "      for k = 0; k < CONFIG_NB_PARTITIONS; k++ {"
print "        partition_hm_table[k].table.partition[i][j] = P_NONE;"
print "    }"
print "  }"
print " }"
print "}"
```

(13) system_hm_table

```
[Conversion Rule]
some s_hm ∈ <System_HM_Table> {
  for each state ∈ s_hm.<System_State_Enrty> {
    for each e ∈ state.<Error_ID_Level> {
      print "system_hm_table.table.system[", e.ErrorIdentifier, "][",
            state.SystemState, "] = ", e.ErrorLevel, ";"
    }
  }
}
```

(14) module_hm_table

```
[Conversion Rule]
some m_hm ∈ <Module_HM_Table> {
  for each state ∈ m_hm.<System_State_Enrty> {
    for each e ∈ state.<Error_ID_Action> {
```

```
print "module_hm_table.table.module[", e.Error Identifier, "][",
    state.SystemState, "] = ", e.Action, ";"
      }
   }
}
```

Third, the configurations included in the PartN_Conf.c file will be described below.

(1) partition_hm_table

A number of partition HM tables equal to the number of partitions are created. Accordingly, a source file having the following assignment form should be created in each partition directory.

(1-1) Assignment statement

```
partition_hm_table[0].table.partition[OVERFLOW]
   [MODULE_INIT]         =
P_NONE;
...
[Conversion Rule]
index = 0
for each p_hm ∈ <Partition_HM_Table> {
   for each s ∈ p_hm.<System_State_Enrty> {
      for each e ∈ state.<Error_ID_Action> {
   print "module_hm_table[", index, "].table. partition[",
      e.ErrorIdentifier, "][", s.SystemState, "] = ", e.Action, ";"
         }
   }
   index = index + 1
}
```

The method and apparatus for performing a configuration of an aeronautical system in compliance with the ARINC 653 standard according to the present invention have the advantage of improving the quality of software and the advantage of improving the efficiency of development by reducing the load of a mere navvy's work because the method and apparatus enable ARINC 653 configurations to be easily and rapidly made.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of performing a configuration of an aeronautical system in compliance with an ARINC (Aeronautical Radio, Incorporated) 653 standard via generation of a source code file, the method comprising:
   displaying a user interface, and receiving setting information in compliance with the ARINC 653 standard;
   generating an intermediate model of source code based on the received setting information;
   creating an Extensible Markup Language (XML) document by performing XML conversion on the generated intermediate model; and
   generating a source code file in compliance with the ARINC 653 standard by converting the generated XML document.

2. The method of claim 1, wherein the user interface comprises a menu for receiving at least one piece of setting information that is selected from among module configuration information, partition information, channel information, and health monitor information.

3. The method of claim 1, wherein the XML conversion that is performed on the generated intermediate model uses an extended ARINC 653 XML schema standard that enables a shared input/output (IO) function to be set.

4. The method of claim 1, wherein the source code file is generated in a form corresponding to a preset source code template.

5. The method of claim 4, wherein the source code file is generated in a form corresponding to the preset source code template based on preset source code conversion rules.

6. An apparatus for performing a configuration of an aeronautical system, comprising:
   a display configured to display a user interface for receiving aeronautical system setting information in compliance with an ARINC (Aeronautical Radio, Incorporated) 653 standard; and
   at least one processor configured to:
      generate an intermediate model of source code based on the setting information received via the user interface;
      create an XML document by performing XML conversion on the generated intermediate model; and
      generate a source code file in compliance with the ARINC 653 standard by converting the generated XML document.

7. The apparatus of claim 6, wherein the user interface comprises a menu for receiving at least one piece of setting information that is selected from among module configuration information, partition information, channel information, and health monitor information.

8. The apparatus of claim 6, wherein an extended ARINC 653 XML schema standard that enables a shared input/output (IO) function to be set is used to create the XML document is used to create the XML document.

9. The apparatus of claim 6, wherein the source code file is generated in a form corresponding to a preset source code template.

10. The apparatus of claim 9, wherein the source code file is generated in a form corresponding to the preset source code template based on preset source code conversion rules.

* * * * *